US010366701B1

(12) United States Patent
Su

(10) Patent No.: US 10,366,701 B1
(45) Date of Patent: Jul. 30, 2019

(54) ADAPTIVE MULTI-MICROPHONE BEAMFORMING

(71) Applicant: Huan-Yu Su, San Clemente, CA (US)

(72) Inventor: Huan-Yu Su, San Clemente, CA (US)

(73) Assignee: QOSOUND, INC., San Clemente, CA (US)

( * ) Notice: Subject to any disclaimer, the term of this patent is extended or adjusted under 35 U.S.C. 154(b) by 0 days.

(21) Appl. No.: 15/681,395

(22) Filed: Aug. 20, 2017

Related U.S. Application Data

(60) Provisional application No. 62/380,372, filed on Aug. 27, 2016.

(51) Int. Cl.

*G10L 15/20* (2006.01)
*G10L 21/0216* (2013.01)
*G10L 21/0224* (2013.01)
*H04R 1/32* (2006.01)
*H04R 29/00* (2006.01)
*G10L 21/0264* (2013.01)

(52) U.S. Cl.

CPC ...... *G10L 21/0216* (2013.01); *G10L 21/0224* (2013.01); *H04R 1/326* (2013.01); *G10L 21/0264* (2013.01); *G10L 2021/02161* (2013.01); *G10L 2021/02165* (2013.01); *G10L 2021/02166* (2013.01); *H04R 29/005* (2013.01); *H04R 2201/401* (2013.01)

(58) Field of Classification Search

None

See application file for complete search history.

(56) References Cited

U.S. PATENT DOCUMENTS 6,738,482 B1 * 5/2004 Jaber ...................... H04R 1/406 379/406.01
6,781,521 B1 * 8/2004 Gardner ................ E21B 47/121 333/18

(Continued)

OTHER PUBLICATIONS

Takuto Yoshioka et al., "Speech Separation Microphone Array Based on Law of causality and Frequency Domain Processing", ISCIT 2009, pp. 697-702.*

*Primary Examiner* — Richard Z Zhu
(74) *Attorney, Agent, or Firm* — Keith Kind

(57) ABSTRACT

Provided is a method and computer program product for producing an enhanced audio signal for an output device from audio signals received by 2 or more microphones in close proximity to each other. For example, one embodiment of the present invention comprises the steps of receiving a first input audio signal from the first microphone, digitizing the first input audio signal to produce a first digitized audio input signal, receiving a second input audio input signal from the second microphone, digitizing the second input audio input signal to produce a second digitized audio input signal, using the first digitized audio input signal as a reference signal to an adaptive prediction filter, using the second digitized audio input signal as input to said adaptive prediction filter and finally adding a prediction result signal from the adaptive prediction filter to the first digitized audio input signal to produce the enhanced audio signal. In other embodiments, any number of microphones can be used, and in all embodiments there is no requirement to detect or locate the source or direction of arrival of the input audio signals.

2 Claims, 10 Drawing Sheets

(56) References Cited

U.S. PATENT DOCUMENTS

| | | | | |
|---|---|---|---|---|
| 6,983,055 | B2 * | 1/2006 | Luo | H04R 3/005 381/313 |
| 6,999,541 | B1 * | 2/2006 | Hui | G10K 11/178 375/350 |
| 7,289,586 | B2 * | 10/2007 | Hui | G10K 11/178 375/349 |
| 7,346,175 | B2 * | 3/2008 | Hui | G10L 15/20 381/74 |
| 7,426,464 | B2 * | 9/2008 | Hui | G10L 21/0272 381/94.1 |
| 7,706,549 | B2 * | 4/2010 | Zhang | H04R 3/005 379/388.01 |
| 7,720,233 | B2 * | 5/2010 | Sato | G10L 21/0208 381/71.1 |
| 8,195,246 | B2 * | 6/2012 | Vitte | G10L 21/0208 381/92 |
| 8,374,358 | B2 * | 2/2013 | Buck | G10L 21/0208 381/92 |
| 9,313,573 | B2 * | 4/2016 | Schuldt | G10L 21/02 |
| 2003/0053639 | A1 * | 3/2003 | Beaucoup | G10L 21/0208 381/92 |
| 2003/0139851 | A1 * | 7/2003 | Nakadai | G10L 21/0208 700/258 |
| 2006/0015331 | A1 * | 1/2006 | Hui | G10L 21/0272 704/227 |
| 2009/0214054 | A1 * | 8/2009 | Fujii | G10L 21/0208 381/94.1 |
| 2011/0096941 | A1 * | 4/2011 | Marzetta | G06F 3/013 381/92 |
| 2014/0126745 | A1 * | 5/2014 | Dickins | H04R 3/002 381/94.3 |
| 2015/0099500 | A1 * | 4/2015 | Chalmers | H04W 4/027 455/418 |

* cited by examiner

ADAPTIVE MULTI-MICROPHONE BEAMFORMING

CROSS REFERENCE TO OTHER APPLICATIONS

The present application for patent claims priority to Provisional Application No. 62/380,372 entitled "Adaptive Multi-Microphone Beamforming" filed on Aug. 27, 2016 by Dr. Huan-yu Su. The above-referenced Provisional application is incorporated herein by reference as if set forth in full.

FIELD OF THE INVENTION

The present invention is related to audio signal processing and more specifically to system and method of adaptive multi-microphone beamforming to enhance speech/audio far-field pickup.

SUMMARY OF THE INVENTION

It is quite natural for human beings to use their own voices as an effective means of communication. Indeed children start to use their voices long before they develop other communication skills, such as reading or writing. The broad adoption of mobile devices is another example that demonstrates the proliferation and importance of voice enabled communications throughout the modern world.

Telephony applications have progressed through a long evolution from wired devices to wireless mobile units, and from operator assisted calls, to fully automated end-to-end user calls across the globe. Increasingly, users appreciate the flexibility and freedom afforded by modern telecommunication devices and services. Another step to further this evolution is to completely liberate users' hands from the operation of their mobile communication devices. The use of hands-free modes for phone calls is not only convenient in many situations, but is often required and frequently enforced by the law, for example, as is the case when using mobile phones while driving.

Another rapidly growing technological area that is currently gaining enormous momentum is the vast array of smart or connected devices (also referred to as the Internet of Things or "IoT", that can be installed almost anywhere including residential homes, office buildings, public spaces, transportation vehicles, and even implanted in human beings. These devices generally include sensors, actuators and the like, and are connected to the Web or other cloud-based services and/or to each other in some fashion. Some residential examples include audio/video equipment, thermostats, appliances, and lighting. IoT devices can be designed and manufactured to respond to voice commands in order to provide increased flexibility and freedom to users.

Major problems that must be overcome when implementing hands-free communications or voice controlled devices are inefficiencies due to the inherent nature of sound waves that degrade when propagating through the air. Specifically, because the strength or intensity of sound waves is inversely proportional to the square of the distance from the source, it becomes increasingly difficult to achieve acceptable results the further away a user is from the input device or microphone.

When a user holds a phone close to his or her mouth, it is not difficult to achieve a sufficiently high signal to noise ratio (SNR), and thus produce acceptable results for voice recognition or noise reduction applications, even in a noisy environment. For example, the volume level of normal speech (as measured close to the human mouth) is approximately 85 dB(A). A background noise level of 70 dB(A) is generally considered a noisy environment, such as a crowded restaurant or bar. This example leads to a SNR of 15 dB, which is large enough to achieve acceptable results for most applications. Examples of such applications include voice recognition accuracy for a voice-controlled device, or a typical noise suppression module for a high quality telephony call.

However, if the user moves only three meters away from the microphone, and still speaks at the same volume, the strength of his or her voice (as measured at the microphone) would now be reduced to around 55 dB(A). Thus, even with a much lower noise level of 50 dB(A), (a level in which most users would describe as quiet), the resulting SNR is only 5 dB, which makes it extremely difficult for applications to produce acceptable results.

In order to mitigate this issue, it is a common industry practice to use multiple microphones, or a microphone array, combined with advanced techniques such as beamforming, to enhance the SNR to produce better results. Traditional beamforming techniques use a "Delay-Sum" approach, which analyze a talker's voice arrival time at each microphone, delays early-arrived speech signals, aligns each of the signals with the latest arrival speech signal, and finally sums up all of the speech signals to create a maximum correlated output speech signal. While this approach is simple and effective, it requires accurate tracking of the user's location relative to the microphones or microphone array to determine the angle of arrival of the speech signals. Errors in determining the user's location relative to the microphones will quickly diminish the beamforming gains, resulting in rapid speech level variations.

Persons skilled in the art would appreciate that, while techniques exist for determining a user's location fairly accurately using multiple microphone inputs, it is nonetheless a very challenging task when ambient noises are present, especially at low SNR conditions. Also, when a user moves around rapidly, such as when walking back and forth inside a home for example, timely and accurate detection of the user's location represents another challenge.

Another difficulty with traditional approaches is that due to design constraints and the like, multiple microphones are not necessarily aligned in a straight line. This makes the estimation of the talker's location even more difficult to calculate and therefore further limits the applicability of traditional methods.

Thus, in order to resolve the limitations of conventional methods and systems and to improve user experience, the present invention provides an adaptive multi-microphone beamforming technique that does not require calculations for the user's location or the direction of arrival of audio signals. In addition, the present invention provides an additional benefit of allowing arbitrary placement of microphones in products without impacting the beamforming performance.

DETAILED DESCRIPTION

The present invention may be described herein in terms of functional block components and various processing steps. It should be appreciated that such functional blocks may be realized by any number of hardware components or software elements configured to perform the specified functions. For example, the present invention may employ various integrated circuit components, e.g., memory elements, digital signal processing elements, logic elements, look-up tables, and the like, which may carry out a variety of functions under the control of one or more microprocessors or other control devices. In addition, those skilled in the art will appreciate that the present invention may be practiced in conjunction with any number of data and voice transmission protocols, and that the system described herein is merely one exemplary application for the invention.

It should be appreciated that the particular implementations shown and described herein are illustrative of the invention and its best mode and are not intended to otherwise limit the scope of the present invention in any way. Indeed, for the sake of brevity, conventional techniques for signal processing, data transmission, signaling, packet-based transmission, network control, and other functional aspects of the systems (and components of the individual operating components of the systems) may not be described in detail herein, but are readily known by skilled practitioners in the relevant arts. Furthermore, the connecting lines shown in the various figures contained herein are intended to represent exemplary functional relationships and/or physical couplings between the various elements. It should be noted that many alternative or additional functional relationships or physical connections may be present in a practical communication system.

Figure 1:
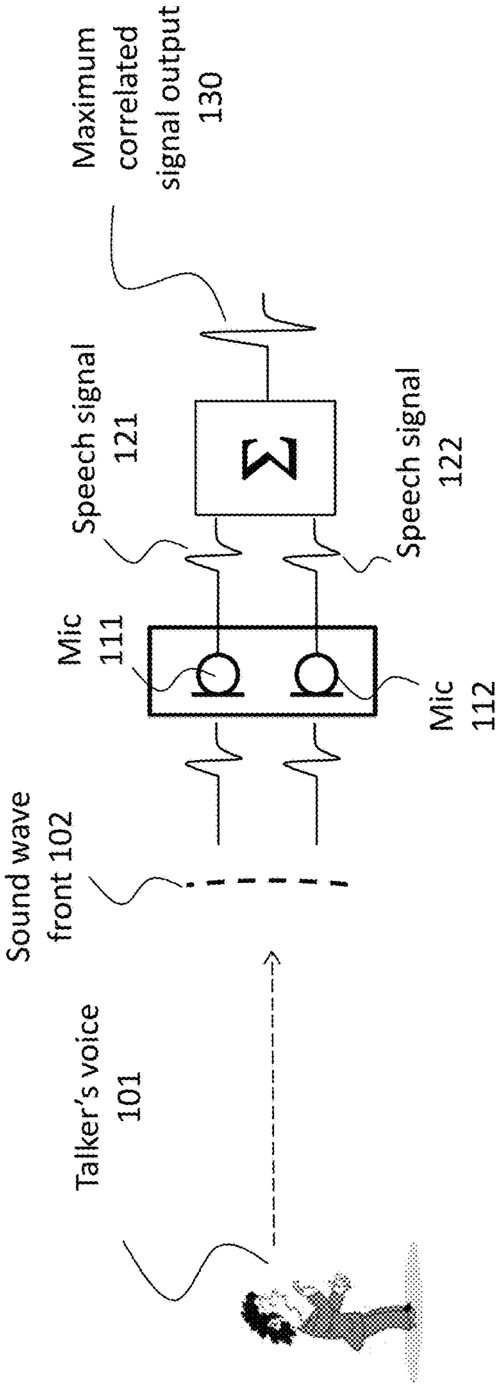
FIG. 1 illustrates the principle of a beamforming technique to enhance the output speech level.

FIG. 1 illustrates the principle of a beamforming technique that enhances a speech signal from a talker 101. In this example, the talker 101 is speaking directly in front of the two microphones 111/112, such that he is 0° or directly perpendicular to the two microphones. In this example, the sound wave front 102 arrives at the two microphones 111/112 at exactly the same time. This causes the resulting electronic speech signals 121/122 to be the same, or at least close enough to be considered the same. Adding such two similar (or highly correlated) signals together results in an output signal 130 with 2 times (2×) amplification of the signal sample values in the time domain, obtaining therefore an energy increase of 4 time (4×), which corresponds to a gain of 6 dB.

Figure 2:
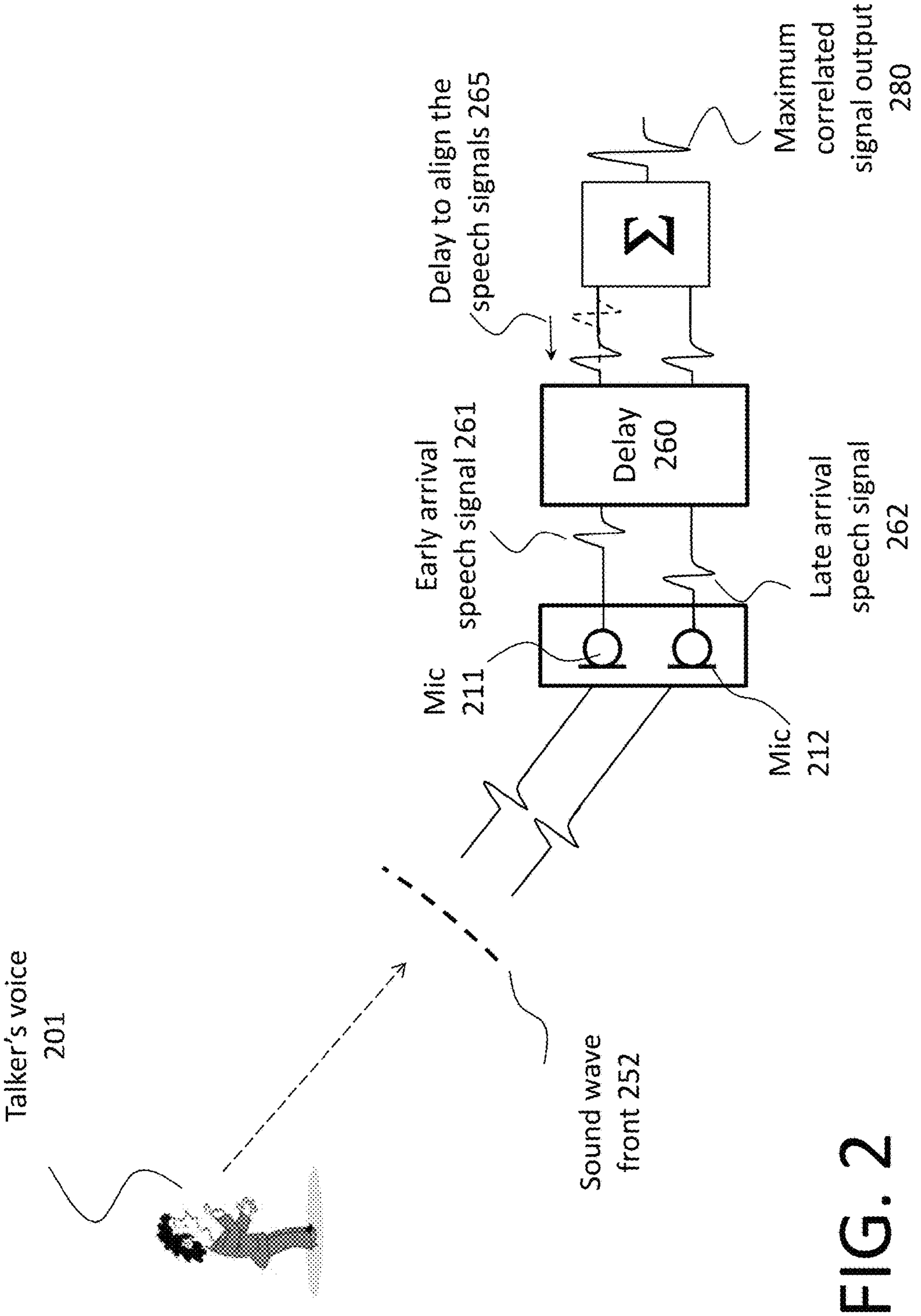
FIG. 2 illustrates the principle of a delay-sum beamforming technique to enhance the output speech level.

Referring now to FIG. 2, the talker 201 is now at an angle of approximately 45° to the two microphones, 211 and 212. The sound wave front 252 arrives at the two microphones at different times, resulting in an early arrival speech signal 261, and a late arrival speech signal 262. With a delay module 260, the early arrival speech signal 261 can be delayed by a certain amount 265 in order to align with the late arrival speech signal 262. Next, adding the delay adjusted signals together results in an enhanced signal 280 with the same 2× amplification gain or a 6 dB energy gain. Note that the example in FIG. 1 can be considered a special case of the more generic case of FIG. 2, where a delay of zero is applied between the two speech signals 121 and 122.

Figure 3:
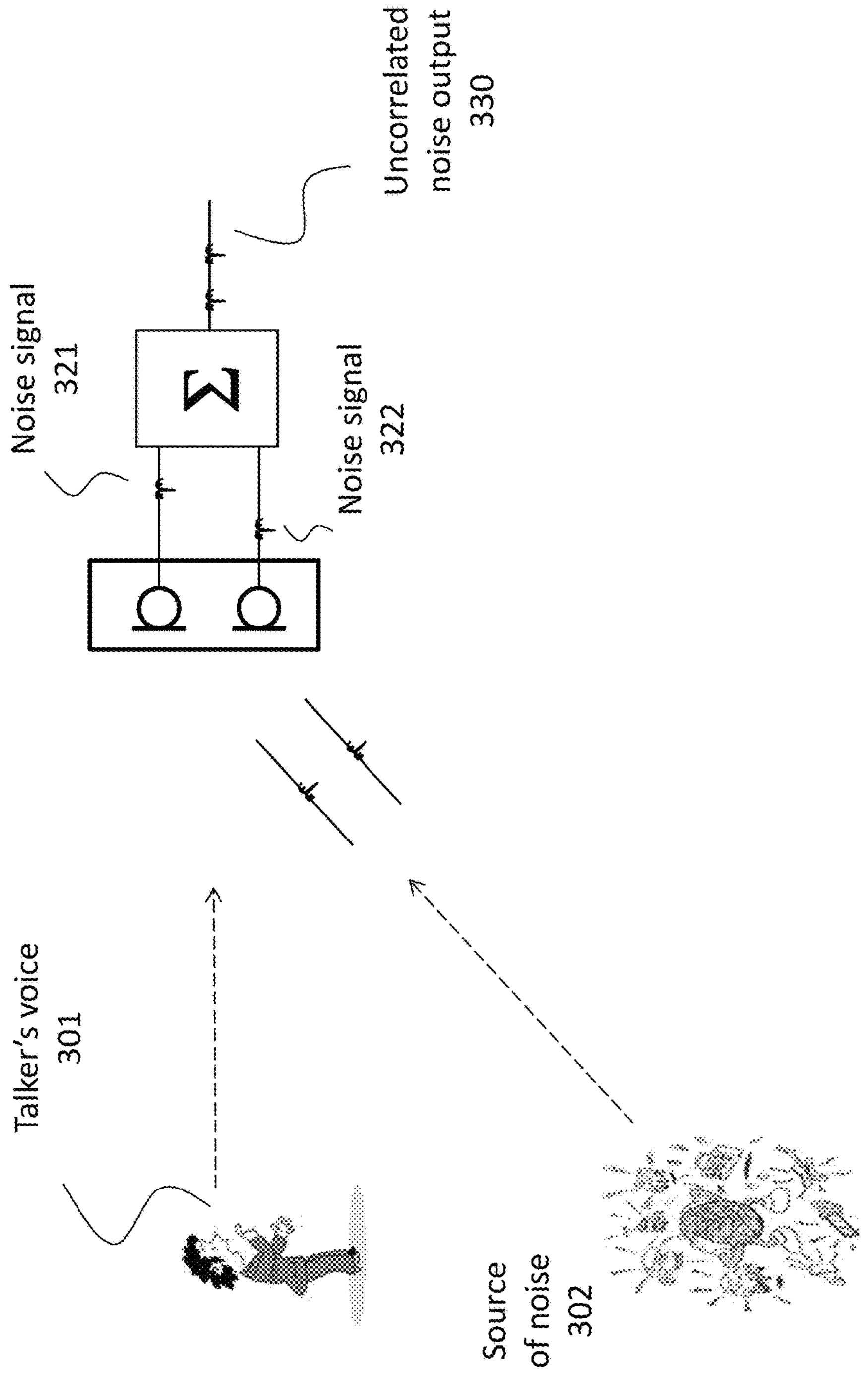
FIG. 3 demonstrates another example with the addition of a noise source.

Referring now to FIG. 3, assuming the source of noise 302 is located at a certain angle, and the noise picked up by the microphones have a certain difference in time as shown in 321 and 322. Since the talker 301 is directly in front or perpendicular to the two microphones, no delay adjustment is performed for the identified speech signal from the talker 301, and therefore the two noise signals remain uncorrelated.

Thus, because the two noise signals 321 and 322 remain uncorrelated, their sum does not create a 2× sample value effect in the output signal 330, as does the voice signal from the talker 301. Therefore, the two uncorrelated noise signals added together is simply a noise energy increase of 2, and a noise level increase of 3 d B.

Figure 4:
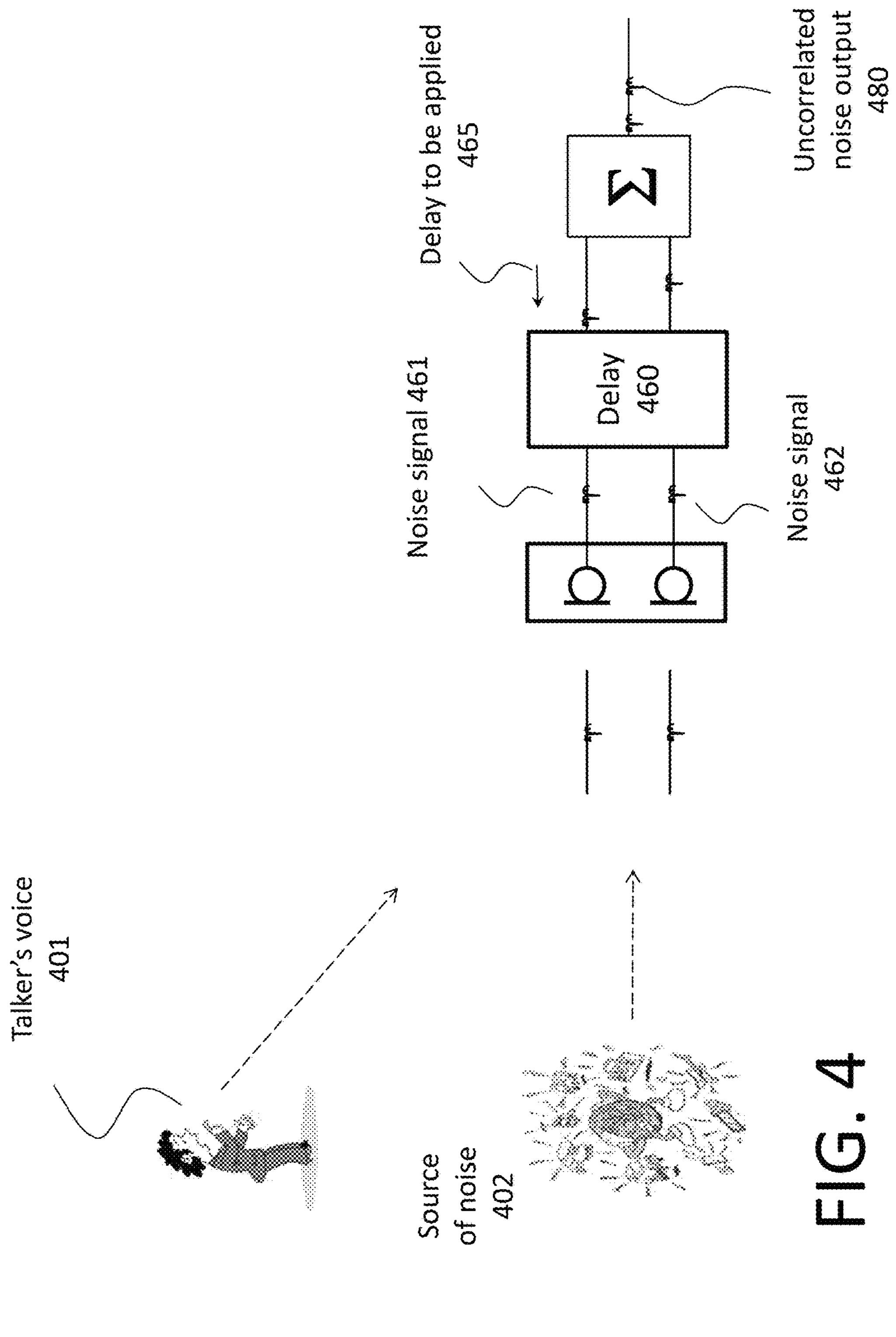
FIG. 4 demonstrates yet another example of a talker and a noise source.

FIG. 4 shows a case where the source of noise 402 is directly in front of the two microphones and the talker 401 is at 45° from the microphones. In this example, the noise arrives at the two microphones at approximately the same time. However, due to the fact that the talker is at a 45° angle, the delay module 460 applies a certain delay 465 to the signal 461 in order to correlate the voice signal from talker's voice 401. This results in a 6 dB energy gain in the voice signal. However, the delay 460 also has the beneficial effect of "de-correlating" the two noise signals 402. Adding the two uncorrelated noise signals together does not achieve the 2× sample value effect as does the voice signal, resulting in a simple increase in the energy of the noise signal by 3 dB in the uncorrelated noise output signal 480.

In an ideal case, with a speech signal energy level increase of 6 dB, and a noise level increase of 3 dB, the maximum gain of a two-microphone based delay-sum beamforming approach is 3 dB SNR. However, as previously mentioned, this traditional method requires extremely accurate knowledge regarding the location of the talker in order to calculate the exact time delay required to create a perfectly correlated speech signal. As would be appreciated by persons skilled in the art, it is often very difficult to accurately and precisely detect a talker's location. When such location information is not accurate or unavailable, the performance of such traditional beamforming systems and methods are dramatically reduced as is often the case when a talker is not stationary.

Another difficulty with traditional delay-sum beamforming is that, due to design constraints, such as required product size, and other form factor considerations, multiple microphones are not necessarily aligned in a straight line. This makes the estimation of the talker's location even more difficult to calculate and therefore further limits the applicability of traditional methods. These types of problems are illustrated in FIG. 5.

Figure 5:
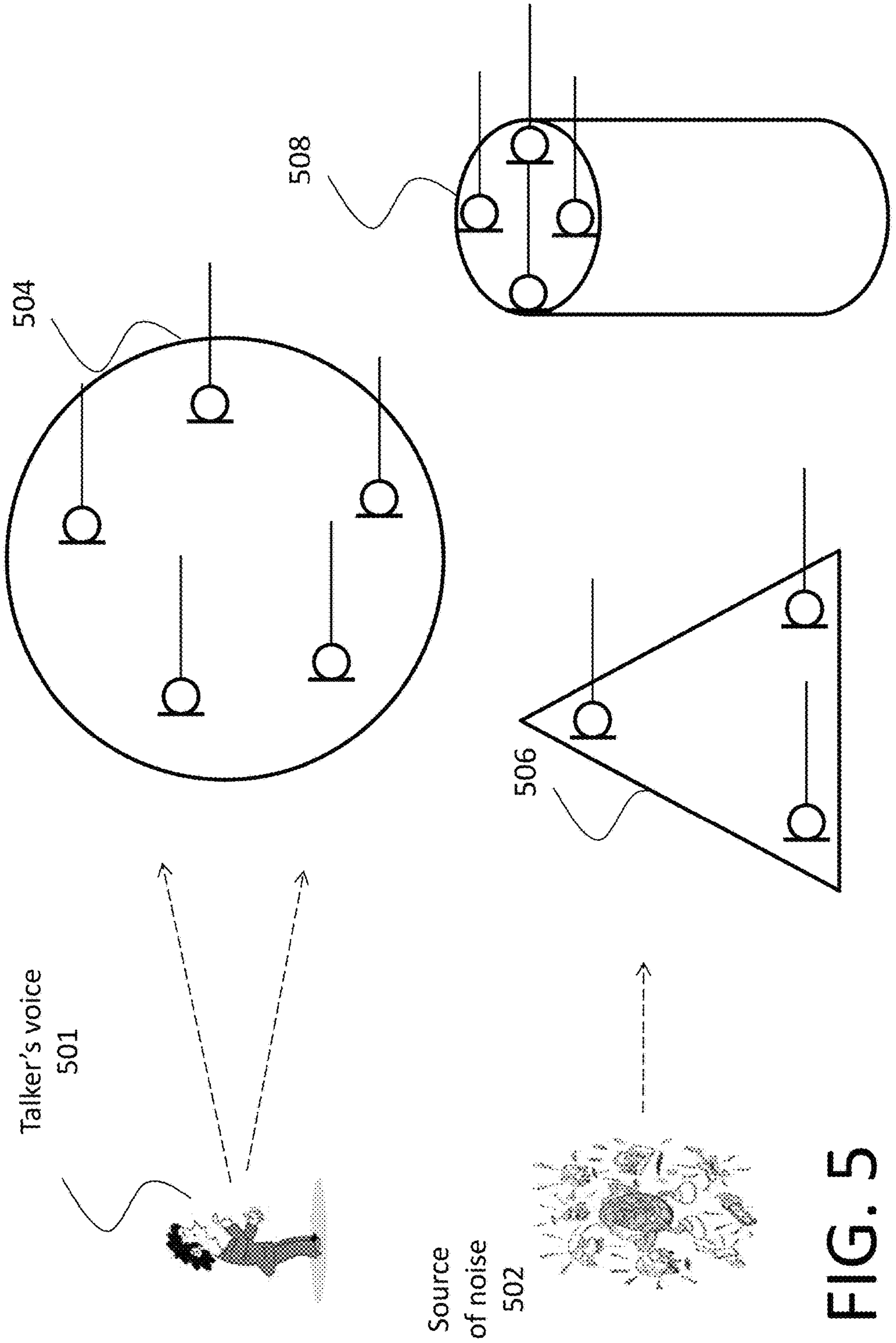
FIG. 5 illustrates examples of product configurations where multiple microphones are not aligned in a straight line.

As shown by the examples depicted in FIG. 5, it is often the case that portable products containing multiple microphones are not necessarily configured in a straight line or in any predictable manner as such products are subject to constant orientation changes by the user. Examples of such products can be seen in 504, 506 and 508. In such cases, it is very difficult to determine the direction of arrival (DOA) of the talker's voice 501 and the noise sources 502. Thus traditional methods of delay-sum beamforming as described above, are extremely difficult to implement under these conditions, and are subject to rapid deterioration in performance and quality by miscalculated DOA estimates The present invention alleviates the problems found in traditional microphone beamforming methods and systems by not requiring any determination of the direction of arrival of the audio sources. Further, because the orientation of the device and the placement of the microphones are irrelevant, the present invention works equally well under all conditions and may be implemented with less complexity than traditional methods.

Figure 6:
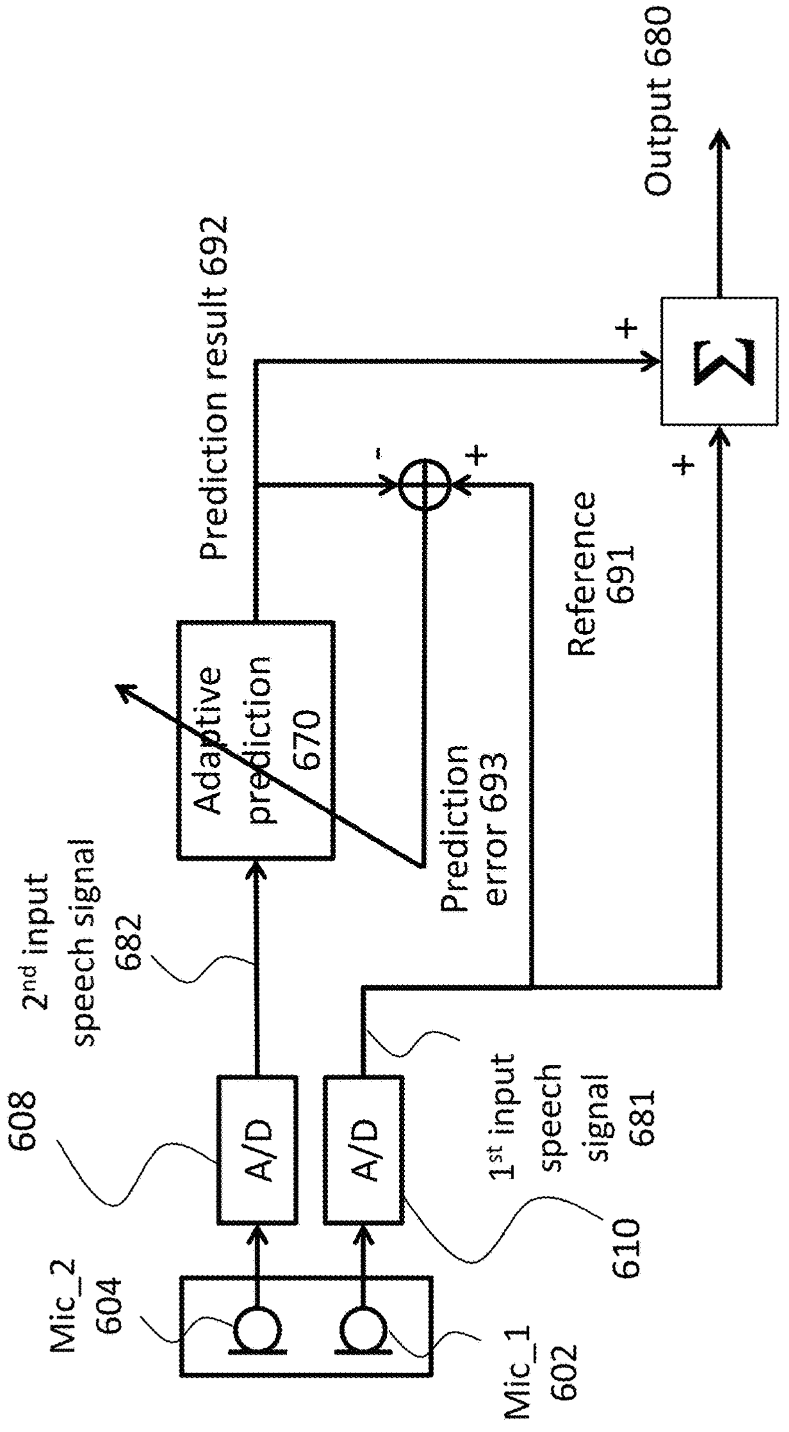
FIG. 6 depicts an exemplary embodiment of the present invention with two microphones.

FIG. 6 shows an exemplary embodiment of the present invention using an adaptive prediction filter module 670. In a preferred embodiment of the present invention a normalized least mean square (NLMS) based adaptive filter is used, however, any type of adaptive prediction filter may be also be used without departing from the scope and breadth of the present invention. Examples of such adaptive filters can be found in the following article, which is incorporated herein by reference as if set forth in full: "Comparison between Adaptive filter Algorithms (LMS, NMLS and RLS)" by Jyoti Dhiman, Shadab Ahmad, and Kuldeep Gulia, published by the Internal Journal of Science, Engineering and Technology Research (IJSETR), Volume 2, Issue 5, May 2013, ISSN:2278-7998.

In general, as stated by the above-referenced article, an adaptive filter is a filter that self adjusts its transfer function according to an optimizing algorithm. It adapts the performance based on the input signal. Such filters incorporate algorithms that allow the filter coefficients to adapt to the signal statics. Adaptive techniques use algorithms, which enable the adaptive filter to adjust its parameters to produce an output that matches the output of an unknown system. This algorithm employs an individual convergence factor that is updated for each adaptive filter coefficient at each iteration.

As shown in FIG. 6, the present invention uses a signal from a first microphone as a reference signal, which is used by the adaptive prediction filter to minimize, in an iterative fashion, a prediction error signal 692, which represents the difference between the two input speech signals 681 and 682. Over time, as the adaptive filter 670 learns the transfer function of the reference signal 691 (also the first input speech signal 681), the prediction error signal 693 approaches zero, and the prediction result signal 692 approaches the reference signal 691. This results in an alignment or a convergence of the second input speech signal that is highly correlated with the first input speech signal 681. The prediction signal result is added together with the reference signal to produce the desired energy gain. In other words, the result of the adaptive prediction filter is an audio signal from the second microphone (prediction result), that is now closely correlated or aligned with the audio signal from the first microphone (the reference signal). This is performed iteratively and automatically and does not require detecting the direction of arrival (DOA) of the audio signals as do traditional methods.

Referring back now to FIG. 6, for a more detailed description, the audio signal from the first microphone input 602 is digitized by the analog to digital convertor (A/D) 610 to become the first input speech signals 681. This first input speech signal 681 is used as a reference single 691 for the adaptive prediction module 670.

The audio signal from the second microphone input 604 is digitized by the A/D converter 608 to become the second input speech signal 682, and is the input to the adaptive prediction module 670. The prediction result 692 is subtracted from the reference signal 691 to obtain the prediction error 693. This prediction error 693 is then used to drive the adaptive prediction module 670, which acts to minimize the prediction error as an objective for the adaptation. The sum of the first input speech signal 681 and the prediction result signal 692 forms the desired output signal 680, which is output to an output device such as a speaker, headphones or the like. Adding such highly correlated signals together results in an output signal 692 with an approximate amplification of 2×.

Please note that in the examples used herein, speech signals are used as examples (such as input speech signals 681 and 682) of the desired type of signals that are enhanced by an embodiment of the present invention. However, in other embodiments, any type of audio signal can be enhanced by the improved techniques described herein, such as music signals and the like, without departing from the scope and breadth of the present invention.

Figure 7:
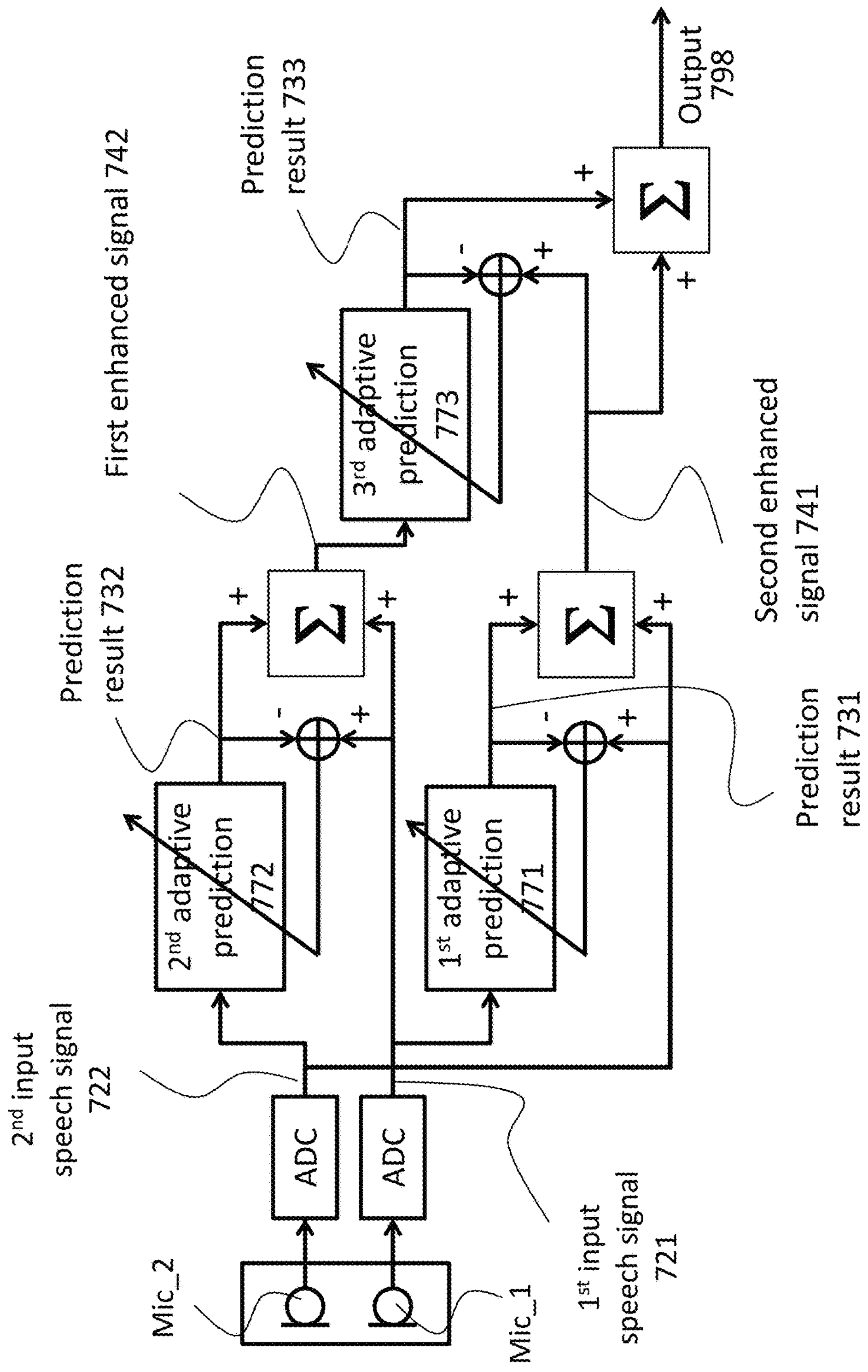
FIG. 7 illustrates another exemplary embodiment of the present invention with two microphones.

FIG. 7 is an alternative embodiment of the present invention using a symmetric arrangement that uses both the first and the second microphone inputs as reference signals for multiple adaptive prediction modules. This embodiment is used to minimize the potential impact to the resulting signals, when the microphone inputs are not consistent, for example, when one of the microphone inputs represents the original audio signal better than the other microphone input. In this fashion, because both microphone inputs 722 and 721 are used as reference signals to the adaptive prediction modules 772 and 771 in the first stage, any impact caused by inconsistent inputs are minimized.

In FIG. 7, a symmetric arrangement is illustrated for the first level of prediction according to one embodiment of the present invention. The digitized first input speech signal 721 is used as reference signal for the second adaptive prediction module 772. The second adaptive prediction module 772 takes the digitized second input speech signal 722 as input, and produces an optimized prediction result 732, which acts to minimize the prediction error between the first input speech signal 721 and the prediction result 732. The sum of 732 and 721 forms the first enhanced signal 742.

Similarly, the digitized second input speech signal 722 is used as reference for the first adaptive prediction module 771, which takes the digitized first input speech signal 721 as input to produce an optimized prediction result signal 731 that minimizes the prediction error between the reference signal 722 and the prediction result signal 731. The sum of 731 and 722 forms the second enhanced signal 741.

The second enhanced signal 741 is used as the reference signal for a second level of prediction according to an example embodiment of the present invention. The first enhanced signal 742 is input to the third adaptive prediction module 773 that produces an optimized prediction result 733 by minimizing the prediction error between second enhanced signal 741 and the prediction result 733. Finally, the sum of 741 and 733 is the desired output signal 798, with is subsequently output to an output audio device.

It should be noted that in this example embodiment, it is assumed that there is a high level of consistency between the first input signal 722 and the second input signal 721. As such, in this example, the second enhanced signal 741 is selected to act as the reference signal to the third adaptive prediction module 773. Indeed, in most cases, were the microphones that comprise the microphone array are closely spaced relative to each other, this consistency is expected. However, in order to minimize any negative effects from inconsistent inputs and to maximize the performance of the present invention, another stage may be added to the embodiment shown in FIG. 7. This alternative embodiment is shown with reference to FIG. 7B.

Figure 7B:
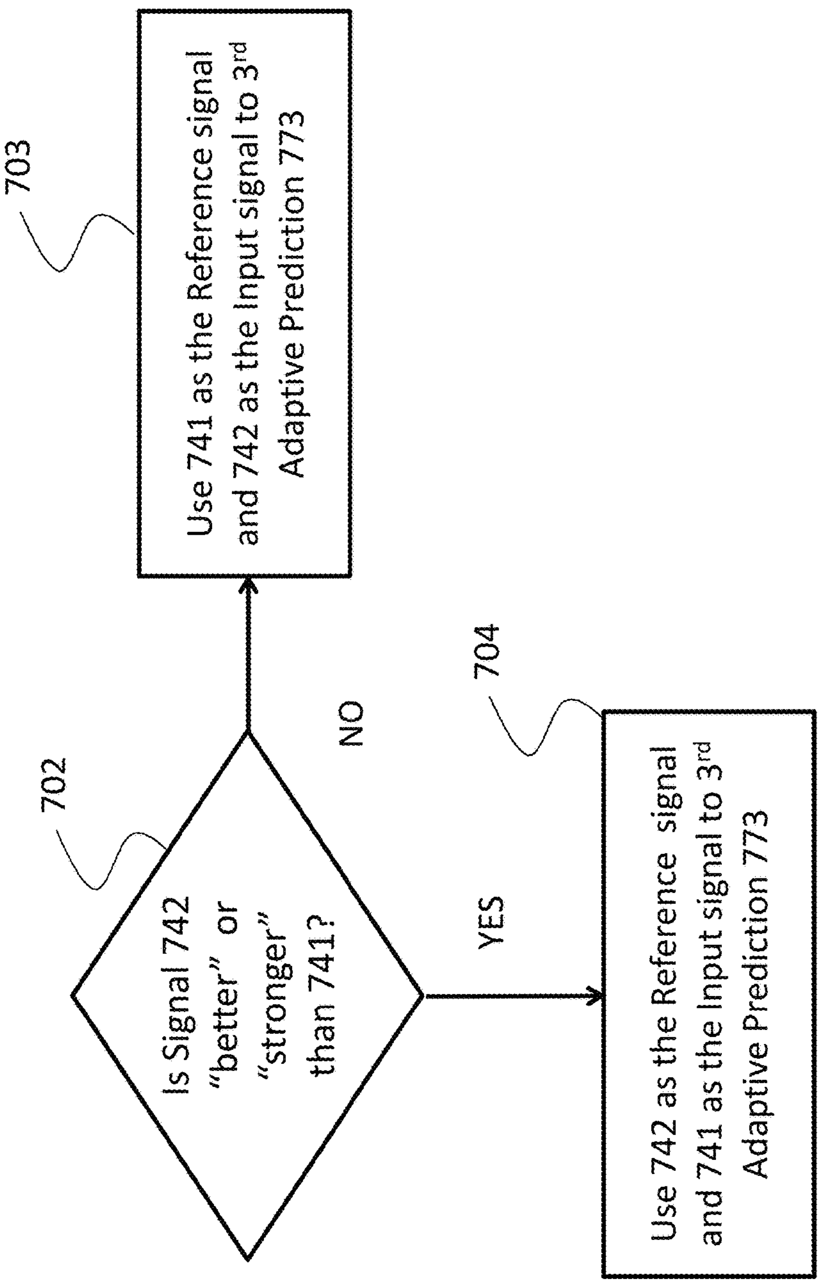
FIG. 7B illustrates another stage that can be used in conjunction with other exemplary embodiments described herein to improve the performance of the present invention.

As shown in FIG. 7B, the first step is to determine which of the audio signals 742 or 741 is the "better" or "stronger" signal. There are many ways to make this determination including finding the signal with the greatest energy, lowest noise component, or better sensitivity, as is the case for example, when a microphone's input is blocked and covered by dust or other objects. In addition, the better or stronger signal can also be determined based on longer term measurements that are well known in the art. Indeed any method for determining a better or stronger signal as a best candidate for a reference signal can be used without departing from the scope and breadth of the present invention. Note that in the examples used herein, such signals are referred to as either "stronger" or "better." Similarly, the term "weaker" is used to describe signals other than those that have been determined to be stronger or better in accordance with the principles of the present invention as disclosed herein.

In this example, the better or stronger single is detected in the first step 702, for example, the signal with the highest energy, or other criteria as discussed above is identified in the first step 702. Once this determination is made, the better signal is used as the reference signal and the other signal or weaker signal, is used as the input signal to the third adaptive prediction module 773. In particular, in step 702, if it is determined that signal 742 is better than 741, then as shown in step 704, the signal 742 is used as the reference signal and the signal 741 is used as the input signal to the adaptive prediction module 773. Similarly, if the Signal 741 is better than (or equal to) 742, then as shown in step 703, the signal 741 is the reference signal and the signal 742 is the input signal to the adaptive prediction module 773. In practice, if the signals are equivalent and neither one is better or stronger than the other, than it makes no difference which signal is used as the reference signal and which signal is used as the input signal.

In yet another embodiment of the present invention, this technique of FIG. 7B can be used in the embodiment discussed above with reference to FIG. 6. That is, in FIG. 6, rather than assigning the first input signal 681 as the reference signal and the second input signal 682 as the input signal to the adaptive prediction module 670, the technique described above in FIG. 7B is used to determine which of the signals 681 or 682 is the better or stronger signal. Once that determination is made, the better or stronger signal is used as the reference signal and the other signal is used as the input signal to the adaptive prediction module 670.

Figure 8:
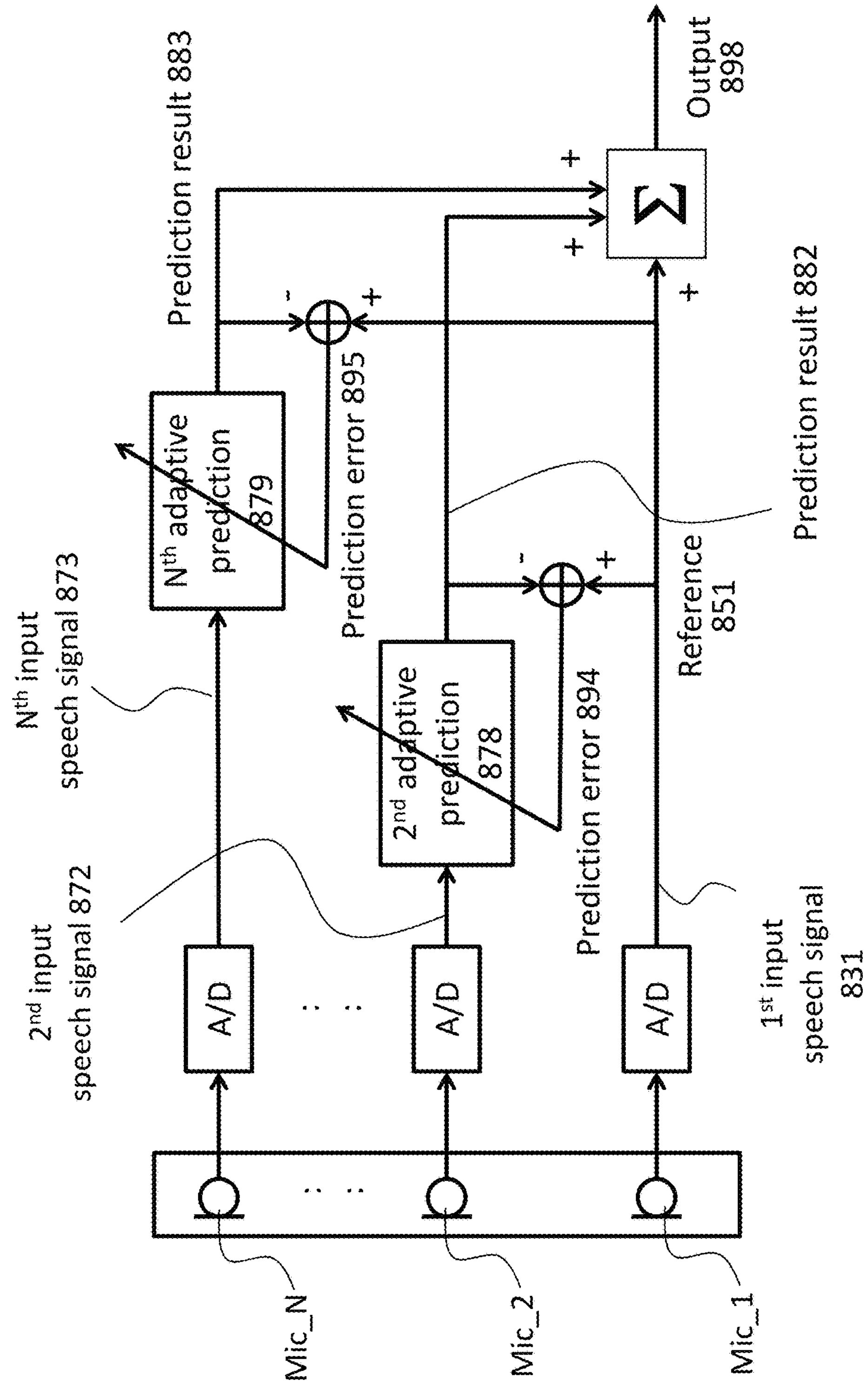
FIG. 8 shows yet another exemplary embodiment of present invention with multiple microphones.

FIG. 8 illustrates another exemplary embodiment of the present invention using multiple microphones (N). In this example embodiment, the number of microphones can be any number greater than 2. The digitized first microphone input is the first input speech signal 831. The first input speech signal 831 is used as the reference signal 851 for each of the N−1 adaptive prediction modules, such as the adaptive prediction modules 878 and 879 shown in FIG. 8.

The digitized second microphone input is the input speech signal 872 that is the input to the second adaptive prediction module 878. Adaptive prediction module 878 functions to minimize the prediction error signal 894 between the reference signal 851 and the prediction result 882. As shown and indicated by the ellipses in FIG. 8, the proceeding modules or steps are repeated for each of the remaining input speech signals until the $N^{th}$ input speech signal 873 is reached. That is, the digitized $N^{th}$ microphone input is the $N^{th}$ input speech signal 873 that is the input to the $N^{th}$ adaptive prediction module 879. Adaptive prediction module 879 acts to minimize the prediction error signal 895 between the reference signal 851 and the prediction result signal 883.

Finally, the sum of the first input speech signal 831 (also the reference signal), and each of the prediction result signals associated with each of the N−1 adaptive prediction filter modules, (such as those shown in 882 and 883), form the desired output signal 898, which is output to an output device.

In yet another embodiment of the present invention, the technique of FIG. 7B can be used in the embodiment discussed above with reference to FIG. 8. That is, in FIG. 8, rather than assigning the first input signal 831 as the reference signal 851 to each of the N−1 adaptive prediction modules (such as shown in 878 and 879), the technique described above in FIG. 7B is used to determine which of the input speech signals 831, 872, . . . 873 is the stronger or better signal. Once that determination is made, the stronger signal is used as the reference signal for each of the N−1 adaptive prediction modules, and the other signals or weaker signals are used as inputs to their respective adaptive prediction modules.

Figure 9:
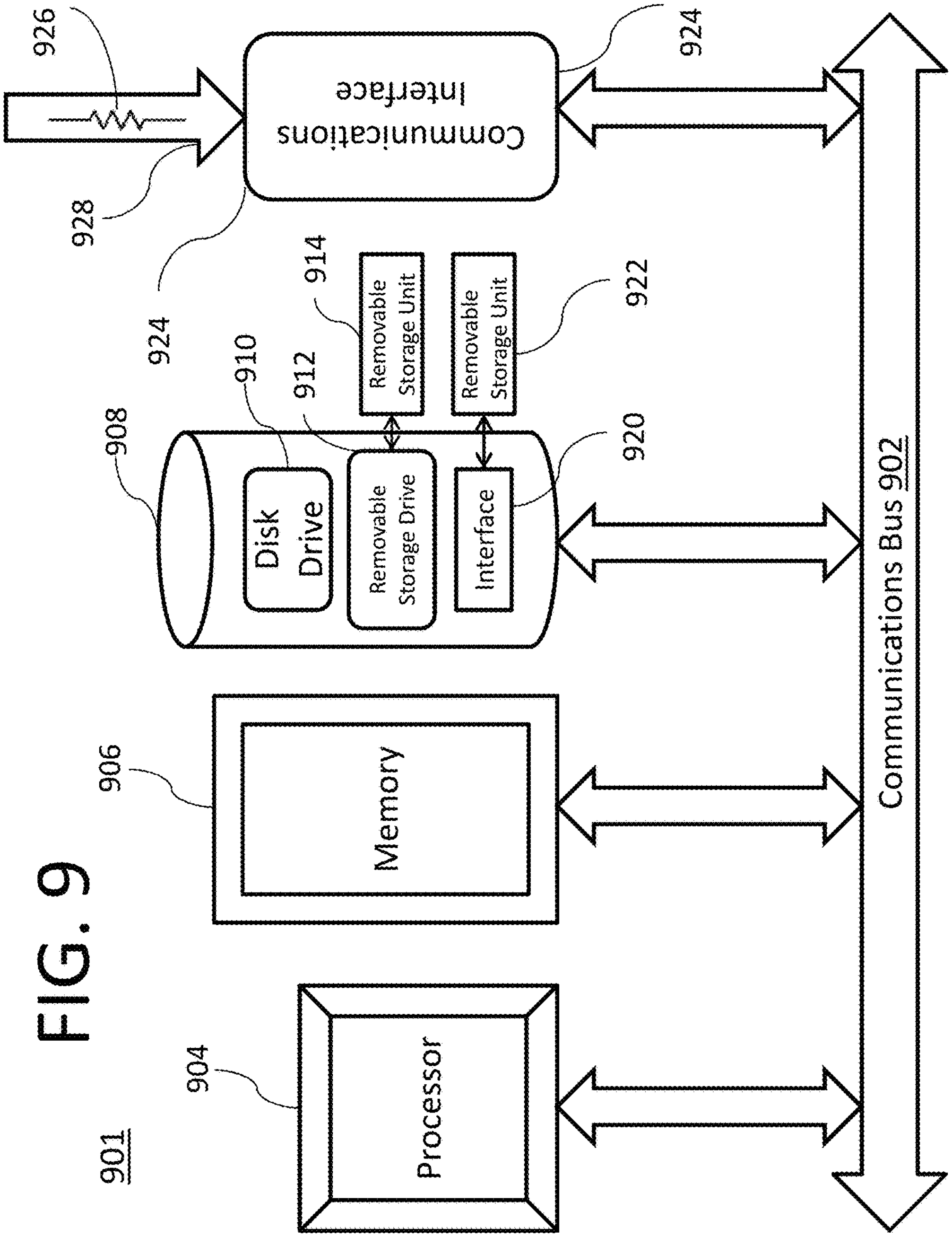
FIG. 9 illustrates a typical computer system capable of implementing an example embodiment of the present invention.

The present invention may be implemented using hardware, software or a combination thereof and may be implemented in a computer system or other processing system. Computers and other processing systems come in many forms, including wireless handsets, portable music players, infotainment devices, tablets, laptop computers, desktop computers and the like. In fact, in one embodiment, the invention is directed toward a computer system capable of carrying out the functionality described herein. An example computer system 901 is shown in FIG. 9. The computer system 901 includes one or more processors, such as processor 904. The processor 904 is connected to a communications bus 902. Various software embodiments are described in terms of this example computer system. After reading this description, it will become apparent to a person skilled in the relevant art how to implement the invention using other computer systems and/or computer architectures.

Computer system 901 also includes a main memory 906, preferably random access memory (RAM), and can also include a secondary memory 908. The secondary memory 908 can include, for example, a hard disk drive 910 and/or a removable storage drive 912, representing a magnetic disc or tape drive, an optical disk drive, etc. The removable storage drive 912 reads from and/or writes to a removable storage unit 914 in a well-known manner. Removable storage unit 914, represent magnetic or optical media, such as disks or tapes, etc., which is read by and written to by removable storage drive 912. As will be appreciated, the removable storage unit 914 includes a computer usable storage medium having stored therein computer software and/or data.

In alternative embodiments, secondary memory 908 may include other similar means for allowing computer programs or other instructions to be loaded into computer system 901. Such means can include, for example, a removable storage unit 922 and an interface 920. Examples of such can include a USB flash disc and interface, a program cartridge and cartridge interface (such as that found in video game devices), other types of removable memory chips and associated socket, such as SD memory and the like, and other removable storage units 922 and interfaces 920 which allow software and data to be transferred from the removable storage unit 922 to computer system 901.

Computer system 901 can also include a communications interface 924. Communications interface 924 allows software and data to be transferred between computer system 901 and external devices. Examples of communications interface 924 can include a modem, a network interface (such as an Ethernet card), a communications port, a PCMCIA slot and card, etc. Software and data transferred via communications interface 924 are in the form of signals which can be electronic, electromagnetic, optical or other signals capable of being received by communications interface 924. These signals 926 are provided to communications interface via a channel 928. This channel 928 carries signals 926 and can be implemented using wire or cable, fiber optics, a phone line, a cellular phone link, an RF link, such as WiFi or cellular, and other communications channels.

In this document, the terms "computer program medium" and "computer usable medium" are used to generally refer to media such as removable storage device 912, a hard disk installed in hard disk drive 910, and signals 926. These computer program products are means for providing software or code to computer system 901.

Computer programs (also called computer control logic or code) are stored in main memory and/or secondary memory 908. Computer programs can also be received via communications interface 924. Such computer programs, when executed, enable the computer system 901 to perform the features of the present invention as discussed herein. In particular, the computer programs, when executed, enable the processor 904 to perform the features of the present invention. Accordingly, such computer programs represent controllers of the computer system 901.

In an embodiment where the invention is implemented using software, the software may be stored in a computer program product and loaded into computer system 901 using removable storage drive 912, hard drive 910 or communications interface 924. The control logic (software), when executed by the processor 904, causes the processor 904 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for producing an amplified enhanced audio signal for an output device from audio signals received by a first and a second microphone in close proximity to each other, said method comprising the steps of:

receiving a first input audio signal from the first microphone;

digitizing said first input audio signal to produce a first digitized audio input signal;

receiving a second input audio input signal from the second microphone;

digitizing said second input audio input signal to produce a second digitized audio input signal;

using said first digitized audio input signal as a input to a first adaptive prediction filter and as reference to a second adaptive prediction filter;

using said second digitized audio input signal as an input to said second adaptive prediction filter and as reference to said first adaptive prediction filter;

adding a prediction result signal from said first adaptive prediction filter to said second digitized audio input signal to produce a second enhanced audio signal; and adding a prediction result signal from said second adaptive prediction filter to said first digitized audio input signal to produce a first enhanced audio signal applying said first enhanced audio signal as input to a third adaptive prediction filter;

applying said second enhanced signal as reference to said third adaptive prediction filter;

adding a prediction result from said third adaptive prediction filter to said second enhanced signal to form said amplified enhanced audio signal; and outputting said enhanced audio signal to an output device.

2. The method of claim 1, further comprising the steps of:

comparing said first enhanced audio signal to said second enhanced auto signal to determine a stronger signal and a weaker signal; and using said stronger signal as said reference signal and said weaker signal as said input signal in said applying steps.

* * * * *